INVENTORS
John N. Wolfram and Emmett C. Hartley.
BY
Mason, Porter & Diller
Attys Patented Aug. 2, 1949

2,478,149

UNITED STATES PATENT OFFICE 2,478,149

COUPLING FOR TUBES

John N. Wolfram and Emmett C. Hartley, Cleveland, Ohio, assignors to The Parker Appliance Company, Cleveland, Ohio, a corporation of Ohio Application December 29, 1944, Serial No. 570,380

1 Claim. (Cl. 285—122)

The invention has to do with new and useful improvements in a coupling for tubes and more particularly for a flareless tube.

An object of the invention is to provide a coupling wherein the tube is held in the coupling by mechanical devices gripping the same and is sealed by a gasket, and wherein the coupling is so dimensioned that the tube and the mechanical devices holding the same in the tube are out of contact with the coupling members so that vibrations imparted to the tube are resisted solely by the gasket.

A further object of the invention is to provide a coupling of the above type wherein two spaced ring gaskets grip the tube and seal the coupling and the mechanical devices for gripping the tube are disposed between the gaskets and are brought into engagement with the tube when the gaskets are deformed by the turning of a nut onto the body member of the coupling.

These and other objects will in part be obvious and will in part be more fully described.

Figure 1:
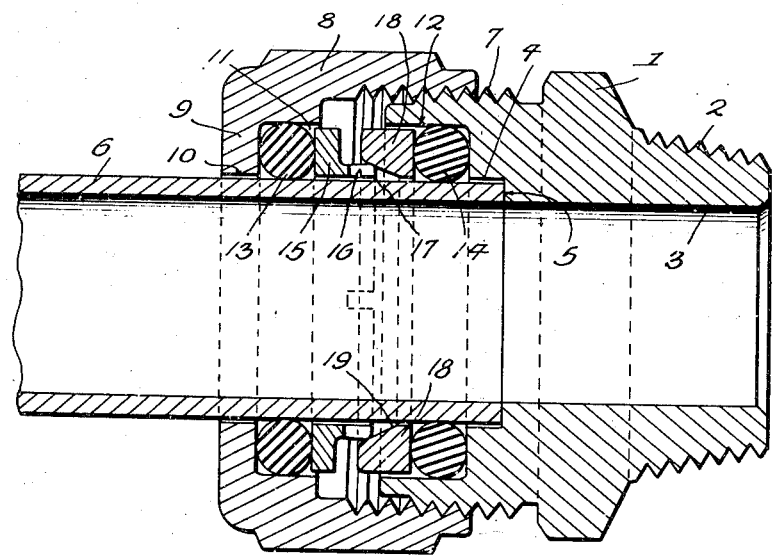
Figure 1 is a longitudinal section through the coupling with the parts assembled and the nut finger-tightened onto the body member.

As shown in the present embodiment of the invention the coupling includes a body member 1 having a threaded portion 2 to which a pipe or other device may be attached. The body portion 1 is provided with a bore 3 and is counterbored as indicated at 4 so as to provide a shoulder 5 which may be used in the initial positioning of a tube in the coupling member. The tube to be attached to the coupling is indicated at 6. It will be noted that the bore 4 is slightly larger than the diameter of the tube 6 so that there is a clearance between the tube and the body member when the tube is centered in the coupling.

The body member 1 is provided with a threaded portion 7 to which a nut 8 is adapted to be connected. The nut 8 has an inwardly extending flange 9 at its outer end which is provided with an opening 10 through which the tube extends into the coupling. This opening 10 is of larger diameter than the diameter of the tube so that the tube, when centered in the coupling, is out of contact with the flange.

The nut is counterbored as indicated at 11 and the body member is counterbored as indicated at 12. These counterbores are of substantially the same diameter and provide an annular chamber surrounding the tube within the coupling. A ring gasket 13 of any suitable deformable material, preferably rubber, is housed in the nut against the flange 9. This ring gasket is preferably circular in cross section and is initially of a cross sectional diameter so that it will grip the tube when placed on the tube and will also grip the nut when the nut is placed over the ring. This is not necessarily a sealing grip but it is a contact which centers the tube in the coupling.

A second ring gasket 14 is similar material and similarly dimensioned is housed in this annular chamber and abuts against the body member 1. This gasket 14 likewise initially contacts with the body member and the tube and further serves to center the tube in the coupling.

Located in the annular chamber between the two ring gaskets is a metal gripping sleeve 15. Said sleeve is so dimensioned that it is out of contact with the nut. The sleeve has a projecting portion 16 which is formed with slits at intervals so that this portion of the sleeve can be readily contacted into engagement with the tube. The inner edge of this section 16 of the sleeve is provided with a cutting edge as indicated at 17.

Also disposed in the annular chamber is a cam ring 18. Said cam ring is dimensioned so that it is out of contact with the body member. The inner face of this cam ring is tapered as indicated at 19. This provides a camming surface so that, when the extension 16 of the sleeve is forced against the same, it will cause the sleeve to be contracted into engagement with the tube and the cutting edge 17 will become embedded in the tube.

When the tube is placed in the body member of the coupling the shoulder 5 serves as a means for initially positioning the tube. However, after the coupling is assembled, the tube is preferably pulled slightly away from the shoulder so as not to contact with the body member 1.

Figure 2:
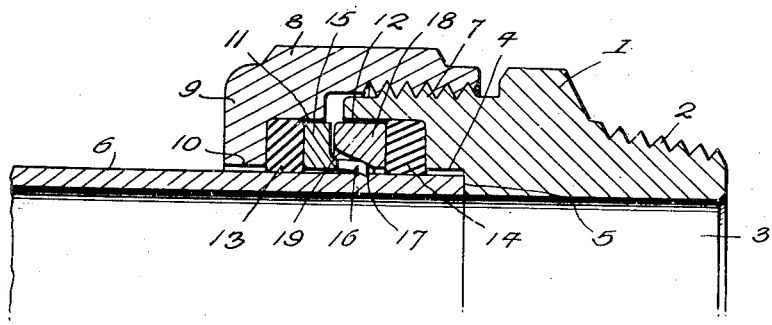
Figure 2 is a view similar to Figure 1 showing the coupling closed and the tube gripped therein.

The nut, when screwed onto the body member, will compress and deform the gaskets as shown in Figure 2. When the gaskets are deformed then the sleeve will be forced against the camming face of the ring 18 and the cutting edge will in turn be forced to cut into the tube. The sleeve and the ring, therefore, serve as devices which will retain the tube in the coupling and prevent its being withdrawn therefrom by an outward pull on the tube. The ring gaskets, when they are deformed, will be pressed tightly against the tube and will serve as a friction grip on the tube which holds the tube centered in the coupling. These gaskets also seal the coupling.

It will be noted from Figure 2 that when the coupling is fully closed there is no contact between the tube, or the mechanical holding devices which engage the tube, and the body member or the nut. In other words, the tube and the holding devices are out of contact with the coupling. Any vibrations imparted to the tube will be absorbed in the gaskets and, within the usual limited range of vibration, there is no contact between the tube and the coupling. Thus a coupling has been produced which withstands severe pull-out strain and which has a very long life as far as vibration is concerned. The amplitude of vibrations which are cushioned by the rubber gaskets is, of course, limited to the clearance space between the tube and the coupling members or between the gripping devices and the coupling member.

It is obvious that many changes in the details of construction and arrangement of parts may be made without departing from the spirit of the invention as set forth in the appended claim.

We claim:

A coupling for tubes comprising a body member and a nut having a threaded connection, said body member having a bore to receive the tube, and providing a seat for the end of the tube, said nut having a flange provided with an opening for the tube, said bore and said opening being of larger diameter than the tube and out of contact with the tube when said tube is centered in the coupling, said nut and said body member being counterbored to provide an annular recess surrounding the tube within the coupling, a deformable ring gasket at each end of said recess and of cross sectional area so as to initially contact the tube and coupling and center the tube in the coupling, a gripping sleeve disposed between the gaskets in said recess in contact with one of the gaskets and having a cutting edge for cutting into the tube, a cam ring disposed in said recess between the gaskets in contact with the other gasket and adapted to engage and contract the sleeve when the sleeve is forced into the cam ring, said nut operating when turned onto said body member to deform the gaskets into tight sealing engagement with the tube and the coupling members and operating through said deformed gaskets to force the cam ring onto the sleeve thereby causing the cutting edge of the sleeve to bite into the tube, said sleeve and said ring being out of contact with the coupling so that lateral vibrations imparted to the tube are restrained solely by said gasket.

JOHN N. WOLFRAM.
EMMETT C. HARTLEY.

REFERENCES CITED

The following references are of record in the file of this patent:

UNITED STATES PATENTS

| Number | Name | Date |
| --- | --- | --- |
| 762,545 | Merriam | June 14, 1904 |
| 1,848,198 | Reid | Mar. 8, 1932 |
| 2,272,812 | Neal | Feb. 10, 1942 |
| 2,394,351 | Wurzburger | Feb. 5, 1946 |

FOREIGN PATENTS

| Number | Country | Date |
| --- | --- | --- |
| 681,127 | France | Jan. 27, 1930 |
| 475,394 | Great Britain | Nov. 18, 1937 |